(12) United States Patent
Brannock et al.

(10) Patent No.: US 10,776,283 B2
(45) Date of Patent: Sep. 15, 2020

(54) TECHNIQUES TO PROVIDE A SECURE SYSTEM MANAGEMENT MODE

(71) Applicant: INTEL CORPORATION, Santa Clara, CA (US)

(72) Inventors: Kirk D. Brannock, Hillsboro, OR (US); Barry E. Huntley, HIllsboro, OR (US); Vincent J. Zimmer, Federal Way, WA (US)

(73) Assignee: INTEL CORPORATION, Santa Clara, CA (US)

( * ) Notice: Subject to any disclaimer, the term of this patent is extended or adjusted under 35 U.S.C. 154(b) by 1021 days.

(21) Appl. No.: 15/089,235

(22) Filed: Apr. 1, 2016

(65) Prior Publication Data

US 2017/0286318 A1    Oct. 5, 2017

(51) Int. Cl.
*G06F 12/14*    (2006.01)
*G06F 13/24*    (2006.01)
*G06F 12/1009*    (2016.01)

(52) U.S. Cl.
CPC ........ *G06F 12/145* (2013.01); *G06F 12/1009* (2013.01); *G06F 13/24* (2013.01); *G06F 2212/1052* (2013.01)

(58) Field of Classification Search
CPC .... G06F 12/1009; G06F 12/145; G06F 13/24; G06F 2212/1052
See application file for complete search history.

(56) References Cited

U.S. PATENT DOCUMENTS

| 4,442,484 | A | * | 4/1984 | Childs, Jr. | ........... G06F 12/1491 711/163 |
| 6,453,278 | B1 | * | 9/2002 | Favor | ......................... G06F 7/74 703/26 |
| 2003/0200405 | A1 | * | 10/2003 | Willman | ................ G06F 12/145 711/163 |
| 2007/0028074 | A1 | * | 2/2007 | Khosravi | ............ G06F 12/1009 711/206 |
| 2009/0119748 | A1 | * | 5/2009 | Yao | ......................... G06F 21/57 726/2 |

* cited by examiner

*Primary Examiner* — Eric T Oberly

(57) ABSTRACT

Various embodiments are generally directed to an apparatus, method and other techniques for allocating a portion of the memory as system management random access memory (SMRAM) including a system management interrupt (SMI) handler for a system management mode (SMM), the SMI handler to handle SMIs for the SMM, generating a page table for the SMM, the page table comprising one or more mapped pages to map virtual addresses to physical addresses for the SMM, and setting one or more page table attributes for the page table to prevent a malicious code attack on the SMM.

20 Claims, 9 Drawing Sheets

700

```
┌─────────────────────────────────────────────┐
│  ALLOCATE A PORTION OF THE MEMORY AS SYSTEM │
│  MANAGEMENT RANDOM ACCESS MEMORY (SMRAM)    │
│  INCLUDING A SYSTEM MANAGEMENT INTERRUPT (SMI)│
│  HANDLER FOR A SYSTEM MANAGEMENT MODE (SMM), THE│
│  SMI HANDLER TO HANDLE SMIS FOR THE SMM     │
│                                             │
│                    705                      │
└─────────────────────────────────────────────┘
                       │
┌─────────────────────────────────────────────┐
│  GENERATE A PAGE TABLE FOR THE SMM, THE PAGE TABLE│
│  COMPRISING ONE OR MORE MAPPED PAGES TO MAP │
│  VIRTUAL ADDRESSES TO PHYSICAL ADDRESSES FOR THE│
│                    SMM                      │
│                                             │
│                    710                      │
└─────────────────────────────────────────────┘
                       │
┌─────────────────────────────────────────────┐
│  SET ONE OR MORE PAGE TABLE ATTRIBUTES FOR THE PAGE│
│  TABLE TO PREVENT A MALICIOUS CODE ATTACK ON THE│
│                    SMM                      │
│                                             │
│                    715                      │
└─────────────────────────────────────────────┘
```

*FIG. 7*

TECHNIQUES TO PROVIDE A SECURE SYSTEM MANAGEMENT MODE

TECHNICAL FIELD

Embodiments described herein generally relate to techniques to provide and process in a secure system management mode (SMM).

BACKGROUND

A computer system typically includes a number of hardware components including a processor to process information and data. The processor may operate in a normal mode and a protected mode such as the system management mode (SMM). SMM allows system developers and operators to provide functions such as power management or security, in a manner that is transparent to the operating system (OS) and other application programs. The processor may enter the SMM via a hardware interrupt referred to as a System Management Interrupt (SMI).

After receiving the SMI, the processor may store the current execution state referred to as the 'context' to a System Management Random Access Memory (SMRAM) before executing instructions, such as a SMI handler. While the processor is operating in SMM, an intruder may write malicious pieces of code to addresses associated with the SMI handler to initiate an attack to take over the processor and system.

BRIEF DESCRIPTION OF THE DRAWINGS

FIG. 7 illustrates an example of a third logic flow.

DETAILED DESCRIPTION

Figure 1:
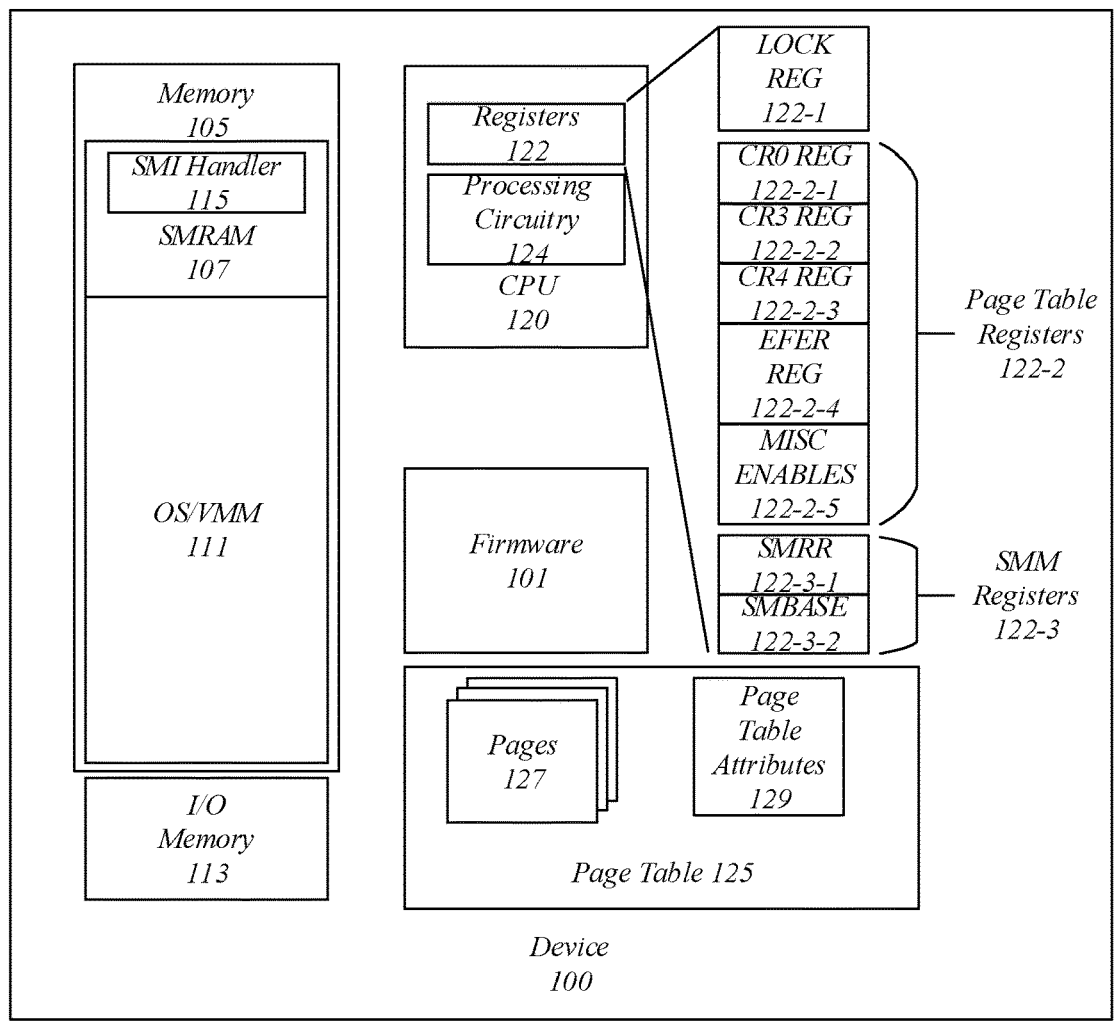
FIG. 1 illustrates an example embodiment of a device.

Various embodiments may be generally directed to eliminating a set of capabilities from the SMM and SMI handler that are necessary for runtime code stream modification, thereby dramatically reducing the possibility of a malicious code injection attack. Typically, the SMM and SMI handler needs a high level of privilege to establish itself in a computer system during the boot sequence, e.g. to configure memory and install/relocate code. Once, the SMI handler and other configurations are complete for the SMM, the high level of privilege is locked down during run-time operations.

For example, the SMM and the SMI handler may be locked down by configuring paging and page table attributes and then using one or more registers to lock the page table and attibutes. More specifically, to configure the SMM and SMI handler, embodiments may include allocating a portion of the memory as SMRAM which may include the SMI handler for entering the SMM. Further, embodiments may include generating a page table for the SMM, which may include one or more mapped pages to map virtual addresses to physical addresses for the SMM. The page table attributes may include one or more permissions and settings that may enable or disable one or more instructions from reading, writing, and executing data and code that may be mapped by the page table. Once the page table attributes are set, a lock register may be used to prevent modification of the page table attributes and page table. Thus, using the page table attributes in conjunction with setting the lock register may provide a more secure compute environment while a device is operating in SMM.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an example embodiment of a device 100 in which aspects of the present disclosure may be employed. The device 100 may include a number of devices, systems, components, circuitry and infrastructure to provide a secure SMM. More specifically, the device 100 may include firmware 101, memory 105, a computing processing unit (CPU) 120, one or more page tables 125 having any number of pages 127 and page table attributes 129. In embodiments, the memory 105 may further include a portion having regions that may be allocated with a system management random access memory (SMRAM) 107 which may be further installed with an SMI handler 115. The memory 105 may also include other regions or a second portion to store information and instructions for an operating system(s) (OS) and virtual machine manager(s) (VMM) in OS/VMM 111. In some embodiments, the device 100 may also include an I/O memory 113 or memory-mapped I/O to communicate with I/O devices. The CPU 120 may include registers 122 and processing circuitry 124. FIG. 1 illustrates device 100 having a limited number of features and embodiments are not limited in this manner.

In various embodiments, the device 100 may be embodied as any type of computing device, including a personal computing, a desktop computer, a tablet computer, a netbook computer, a notebook computer, a laptop computer, a server, server farm, blade server, or any other type of server, and so forth. In some embodiments, the device 100 may be a communication station, a mobile station, an advanced station, a client, a platform, a wireless communication device, a mobile computer, a set-top box, a handheld computer, a handheld device, a Personal Digital Assistant (PDA) device, a handheld PDA device, netbook, a mobile telephone, a smart phone, a mobile cellular telephone, and so forth. Embodiments are not limited in this manner.

In some embodiments, the device 100 may include one or more CPUs 120 which may include one or more cores to process information for the device 100. The CPU 120 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. In some embodiments, the CPU 120 may be connected to and communicate with the other elements of the computing system via an one or more interconnects, such as one or more buses, control lines, and data lines.

As previously mentioned, the CPU 120 may include a number of registers 122 including a lock register 122-1 that may be used by the device 100 to prevent malicious code and attacks using SMM code from modifying the page table attributes 129 and other registers 122. More specifically, the lock register 122-1 may be used to lock or prevent modification of paging related registers, such as the page table registers 122-2 and SMM related registers such as the SMM registers 122-3. The lock register 122-1 may be a new model-specific register (MSR) and may be written to via the write the model-specific register (WRMSR) instruction. In some embodiments, the WRMSR instruction to write to the lock register 122-1 may occur in response to the occurrence of a SMI entry point, before the SMI code branches or consumes data. Effectively, the WRMSR instruction to write to the lock register 122-1 may be straight-line code that causes the lock to be set on each SMI before any possible vulnerability could be exploited. In some embodiments, the lock register 122-1 may be updated by the CPU 120 in response to a SMI close instruction. Further and as an alternative to using the lock register 122-1 on each SMI entry point, the page table registers 122-2 and SMM registers 122-3 may be set and permanently locked within the SMM, but require an entry in the page table 125 with paging turned on. Note that in some embodiments, the entire lock register 122-1 may be set to lock down an associated paging table 125 and page table attributes 129. However, in the same or other embodiments, certain bits of the lock register 122-1 may be used to lock down an associated page table 125 and page table attributes 129. In some embodiments, one or more bits may each be associated with a different page table and page table attributes. Embodiments are not limited in this manner.

The CPU 120 may include a number of page table registers 122-2, such as a CR0 register 122-2-1, a CR3 register 122-2-2, a CR4 register 122-2-3, an EFER register 122-2-4, and one or more MISC ENABLE registers 122-2-5. These registers may control various aspects and settings of the page table 125 and pages 127. For example, the CR0 register 122-2-1 is a control register that may be used to modify basic operations of the CPU 120 associated with paging and other processing. In another example, the CR3 register 122-2-2 is used for virtual addressing and enables the CPU 120 to translate linear addresses into physical addresses by locating the page directory (not shown) and page table 125. The CR4 register 122-2-3 is used for protected mode to I/O breakpoints, page size extensions, and machine check extensions. The EFER register 122-2-4 is a MSR that is used to allow and enable system call and system return instructions. The EFER register 122-2-4 may be used to control execute-disable (XD) and whether long mode is enabled for the page table 125.

The CPU 120 may also include SMM registers 122-3 such as the system management range register (SMRR) 122-3-1 to control caching for the CPU 120 in SMM and the SMBASE register 122-3-2 which may have a pointer to the beginning of the SMM state-save map, and stores the contents in a downward direction. Embodiments are not limited to these specific registers. The CPU 120 may also include other registers, such as the MSEG_BASE register, that may be related to SMM and may be locked via utilization of the lock register 122-1

The CPU 120 may also include processing circuitry 124 to process information and instructions for the device 100. The processing circuitry 124 may be circuitry that carries out the instructions of a computer program by performing the basic arithmetic, logical, control and input/output (I/O) operations specified by the instructions. For example, the processing circuitry 124 can include an arithmetic logic unit (ALU) that performs arithmetic and logic operations. In some instances, the registers 122 may supply operands to the ALU and store the results of ALU operations. The processing circuitry 124 may also include a control unit that fetches instructions from memory and "executes" them by directing the coordinated operations of the ALU, registers 122 and other components. Embodiments are not limited in this manner and the above-description only provides a high-level overview of processing by the processing circuitry 124 for the CPU 120.

The device 100 also includes memory 105 which may be any type of memory capable having one or more regions or portions to store information and data. In some embodiments, the memory 105 may include a first portion allocated as the SMRAM 107 to store information and instructions used with the SMM. In some embodiments, the SMRAM 107 may be referenced as SMM memory. Further, the SMRAM 107 may be a special portion of the memory 105 that is only accessible while the CPU 120 is operating in the SMM and to the SMM code. In some embodiments, the SMRAM 107 may be have the ability to be relocated within the memory 105 and locatable by the pointer in the SMBASE register 122-3-2. Thus, embodiments may include locking access to the SMBASE register 122-3-2 to secure the system while operating in the SMM.

Further, the SMRAM 107 may include an SMI handler 115 installed by the firmware 101 to handle SMIs to cause the device 100 to enter the SMM. The SMIs offer extended functionality, such as legacy hardware device emulation and system management tasks. As will be discussed in more detail below, the firmware 101 may be part of the basic input/output system (BIOS) or unified extensible firmware interface (UEFI) used to perform hardware initialization and performing the booting sequence. The SMI handler 115 may be inserted in the SMRAM 107 during an initialization phase of the device 100. For example, the SMI handler 115 may be installed during the power-on self-test sequence (POST) at a checkpoint and may be functional thereafter. Once the SMI handler 115 is installed and configured in the SMRAM 107, the SMI handler 115 may be locked, via a setting a register, to provide a more secure SMM environment.

The memory 105 may also include a second region allocated to the OS/VMM 111, which may be used by the OS and/or VMMs. For example, the memory 105 may store data momentarily, temporarily, or permanently for an OS, such as Windows®, Apple OS®, Linux®, UNIX®, VMMs, and so forth. Moreover, the memory 105 may store instructions and data for operating the device 100 and an OS. The memory 105 may also store temporary variables or other intermediate information while the CPU 120 is executing instructions for the OS. Embodiments are not limited in this manner.

The memory 105 may be one or more of random access memory (RAM), read-only memory (ROM), electrically erasable programmable read-only memory (EEPROM), flash memory, and so forth. The memory 105 is not limited to these memory components. For example, the memory 105 may include a non-transitory computer-readable storage medium.

In some embodiments, the device 100 may include input/output (I/O) memory 113 which may be mapped to enable peripheral devices to communicate and operate with the device 100 and CPU 120. In some instances, the mapped I/O memory 113 may be part of memory 105 and other instances mapped I/O memory 113 may utilize different, dedicated memory for I/O devices. In some embodiments, the mapped I/O memory 113 utilizes memory mapped I/O (MMIO) operations and/or port-mapped I/O (PMIO) operations to perform I/O between the CPU 120 and peripheral devices. MMIO uses the same address bus to address both memory 113 and I/O devices—the memory 113 and registers of the I/O devices are mapped to address values. Thus, when an address is accessed by the CPU 120, it may refer to a portion of physical memory, 113 but it can also refer to memory of the I/O device. Thus, the CPU instructions used to access the memory 113 can also be used for accessing devices. Each I/O device monitors the CPU's 120 address bus and responds to any CPU 120 access of an address assigned to that device, connecting the data bus to the desired device's hardware register. Embodiments are not limited in this manner.

In embodiments, the device 100 also includes at least one page table 125 having a number of pages 127. In the illustrated embodiment, the page table 125 may be an SMM page table that may be utilized by the CPU 120 during SMM. Although not illustrated as part of the memory 105, the page table 125 may be a data structure stored in the memory 105 that is used by the virtual memory system to store mappings between virtual addresses and physical addresses of the memory 105. In some embodiments, the pages 127 may include mapped code pages and mapped data pages. However, embodiments are not limited in this manner and the pages may store other types of data and information. In operation, the CPU 120 may include a memory management unit (MMU) (not shown) that may utilize the page table 125 to locate information via a physical address of the memory 105. In embodiments, a page table lookup may fail if a page is not resident in the physical memory, a translation cannot be performed, a requesting process does not have permission to access the information, and so forth.

As mentioned, the page table 125 may be an SMM page table and page protections may be applied to the page table 125 and pages 127 to prevent attacks. More specifically, one or more page table attributes 129 may be configured for the page table 125 to limit access via setting permissions for the pages 127 including the mapped code pages and the mapped data pages. As will be discussed in more detail below, the page table 125 and appropriate page table attributes 129 may be generated and set during the configuration of the SMI handler 115, early in the initialization phase of the device 100 and prior to the SMI handler 115 being locked down.

The page table attributes 129 may include settings for one or more of the pages 127 of the page table 125 including the mapped code pages and the mapped data (non-code) pages. These settings in the page table attributes 129 may include permissions to write, read, and/or execute information and data in the pages 127. In some embodiments, a combination of permissions may be set for one or more pages 127 in the page table 125. The page table attributes 129 may ensure the pages 127 are protected and to prevent malicious attacks, such as a code injection attack. For example, all mapped code pages may be designated as read-only and execute such that any attempt to overwrite a code page will cause a page fault. In another example, all mapped data pages may be designated as execution disable (eXecutionDisable) such that any attempt to execute a data page will cause a page fault. In a third example, one or more of the mapped data pages may be designated as read and write (ReadWrite), while others may be designated as read-only (ReadOnly). More specifically, data pages that map the page table 125 itself, include critical data such as global descriptors and interrupt descriptors, and additional data such as information in the system management system table (SMST) data and SMM data. The SMM data may include structures such as the protocol database, S3 resume, script, and so forth. Thus, any attempt to write to a page set as read-only will cause a page fault. Embodiments are not limited in this manner and, in some instances, any page 127 that does not need to be written to at the runtime may be set as read-only.

In some instances, data in particular pages 127 may need to be accessed and written to during runtime. Thus, these pages 127 may be designated read and write and may include the program stack, dynamic global data, and the SMM state save area. Further and to ensure an optimal configuration and permission settings for the pages 127, embodiments may include the firmware 101 to cause data that requires read and write permissions to not reside on the same page as data that can be configured as read-only. In other words, the firmware 101, which may be part of the BIOS instructions, may configure the page table 125 and pages 127 such that data requiring read and write permissions does not reside on a same page as data requiring read-only permissions. Embodiments are not limited in this manner. The firmware 101 may perform a relocation operation to move read-only data to pages with other read-only data and move read and write data to pages with other read and write data, for example.

In some case, one or more pages 127 may be omitted from the page table 129. These pages 127 may be located in the OS/VMM 111 region. Omitting these pages 127 from the page table 125 will render benign many otherwise potentially exploitable bugs that could result in a "confused deputy" privilege escalation attack from the SMI handler 115.

As mentioned, the device 100 may also include the firmware 101 to configure various aspects of embodiments described herein. In some embodiments, the firmware 101 may be a set of instructions programmed or hardcoded into read-only memory that saves and holds information even when power is not being applied. The firmware 101 may at least partially be implemented as part of the system BIOS that is used to initiate the device 100 and various hardware components of the device 100, such as the CPU 120 and the memory 105.

The firmware 101 may be utilized to allocate the memory 105 for the SMRAM 107, initialize and install the SMI handler 115, and set the page table attributes 129. In some embodiments, the firmware 101 may set the page table attributes 129 during the initialization and installation of the SMI handler 115 prior to the SMI handler 115 being locked down. For example, power may be applied to the device 100 causing one or instructions to be fetched from flash memory and processed to begin a boot sequence of the device 100. As part of the initialization, various hardware components may be initialized and configured based on information in the firmware 101. For example, the CPU 120 may be configured and put into an initial state, the memory 105 may be initialized, other components and controllers may be initialized including I/O controllers, one or more storage devices, and so forth. The initialization process may continue and include installing the SMI handler 115 in the SMRAM 107, generating a page table 125 and pages 127 for the SMRAM 107 and generating page table attributes 129 for the page table 125.

In some instances and more specifically, the firmware 101 may include one or more instructions that may be processed by circuitry, such as processing circuitry 124, to cause the allocation of regions of memory 105 for use by the device 100. One particular region may be the SMRAM 107 which may be used by the CPU 120 during processing in the SMM. During the allocation of the SMRAM 107, the SMI handler 115 code and SMM data to handle SMIs may be installed in the SMRAM 107. Typically, once the SMI handler 115 is installed into the SMRAM 107, the SMI handler 115 is locked away and cannot be accessed by non-SMM code. Further, while it is possible for the SMI handler 115 to modify itself, once the initial configuration is complete and locked away the SMI handler 115 is static and cannot be modified. Thus, firmware 101 may also include one or more instructions to prohibit the SMI handler 115 from modifying itself, even during the initialization stage. Any exploitable vulnerabilities in the SMI handler 115 will also not have the ability to modify the SMI handler 115 itself adding another layer of protection from attack.

The firmware 101 may also include one or more instructions to generate the page table 125 and pages 127 for the SMRAM 107 and for use while the CPU 120 is in the SMM. In some instances, the page table 125 and pages 127 may be generated during the dynamic phase of the SMI handler 115 installation before the SMI handler 115 is locked down and put into a static state. As part of the generation of the page table 125 and the pages 127, the instructions may apply the appropriate page protections and permissions to the page table 125 and pages 127 by setting one or more page table attributes 129. More specifically, the instructions may include setting one or more page table attributes 129 to specify read, write, and/or execution permissions for the page table 125 and pages 127. These page table attributes 129 may be set in a secure manner and may not be modified during processing while the CPU 120 is in the SMM.

As previously mentioned, the lock register 122-1 may be used by the device 100 to prevent malicious code and attacks using SMM code from modifying the page table attributes 129. More specifically, the lock register 122-1 may be used to lock or prevent modification of the paging related registers, such as the page table registers 122-2 and SMM related registers such as the SMM registers 122-3, as previously discussed. For example, the lock register 122-1 may be written to during the initiation of the SMM to ensure that the one or more page table attributes 129 configured during the initialization stage and installation of the SMI handler 115 are not overwritten or changed during operation in SMM.

Figure 2:
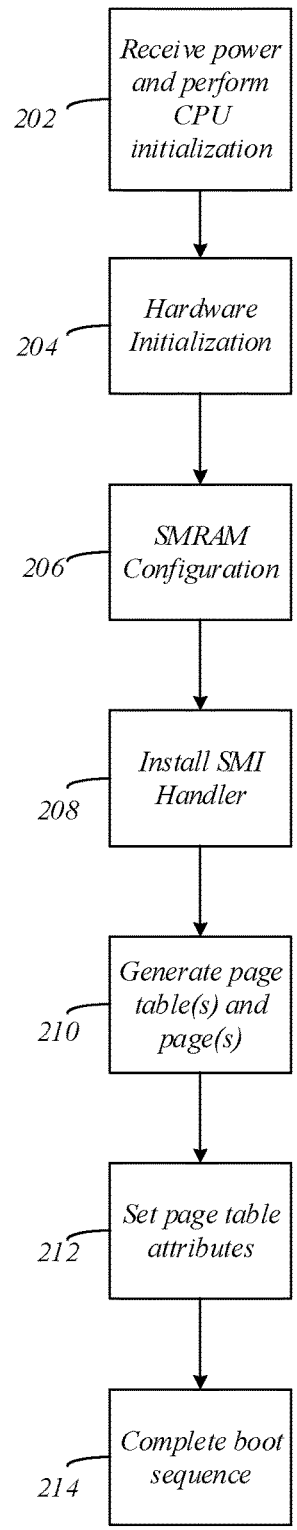
FIG. 2 illustrates an example of a first logic flow.

FIG. 2 illustrates one embodiment of a first logic flow 200. The logic flow 200 may be representative of some or all of the operations executed by one or more embodiments described herein. Further, the logic flow 200 may performed by circuitry and one or more components discussed herein, such as the processing circuitry 124. Moreover, logic flow 200 may be performed in conjunction with one or more other logic flows discussed herein and lists particular steps occurring in a particular order.

The logic flow 200 may be one example flow to configure one or more page table attributes 129 for a page table 125, such as an SMM page table. In embodiments, the logic flow 200 may include receiving power by the device 100 and performing a CPU 120 initialization for further processing. For example, a user or another device may cause the device 100 to receive power to turn on the device 100. The CPU 120 initializes itself, which is triggered by a series of clock ticks generated by a system clock (not shown). Part of the CPU's 120 initialization is to look for firmware 101, e.g. the BIOS, for a first set of instructions in the startup program. As previously discussed, the firmware 101 may store the first instructions, which initialize and configure other hardware components, including controllers, memory, video cards and storage of the device 100 at block 204. More specifically, the first set of instructions in the firmware 101 may specify a POST operation stored in a predetermined memory address of memory 105, for example. The POST begins by checking the firmware 101 and performs a battery test. If the POST does not detect a battery failure, it then continues to initialize the CPU 120, checking the inventoried hardware devices (such as the video card), secondary storage devices, such as hard drives and floppy drives, ports and other hardware devices, such as the keyboard and mouse, to ensure they are functioning properly.

As part of the initialization process and once the POST initializes and checks the memory 105, a portion of the memory 105 may be configured as SMRAM 107 at block 206. As previously discussed, the SMRAM 107 may be used by the CPU 120 when the device is operating in the SMM. The SMM is an operating mode of the CPU 120 in which all normal execution, including the operating system, is suspended and special separate software, which is usually part of the firmware 101 (or other firmware) is executed with high privileges. SMM is a special-purpose operating mode provided for handling system-wide functions like power management, system hardware control, or proprietary OEM designed code. It is intended for use only by system firmware, not by applications software or general-purpose systems software. The main benefit of SMM is that it offers a distinct and easily isolated processor environment that operates transparently to the operating system or executive and software applications. However, operating with such high privileges comes with risk of attacks, and as such, securing the system from these attacks while operating in the SMM is essential.

At block 208 an SMI handler 115 may be installed or inserted in the SMRAM 107 region of the memory 105. As previously mentioned, the SMI handler 115 may be installed during the POST at one of the checkpoints, which may be based on a particular configuration of the firmware 101. Thereafter, the SMI handler 115 may be locked down and used to handle interrupts, such as SMIs, to cause the device 100 to enter the SMM. However, prior to locking down the SMI handler 115, embodiments may include generating a page table 125 with pages 127 and page table attributes 129.

More specifically and at block 210, embodiments may include generating a page table 125 and pages 127 by the firmware 101, for example. As previously mentioned, the page table 125 may be an SMM page table which includes mapped code pages and mapped data pages. In some instances, the page table 125 and pages 127 may be stored in the memory 105 or in another location, such as a secure or protected memory that uses encryption, for example. Embodiments are not limited in this manner. In some embodiments, the firmware 101 may include instructions to ensure data with the same permission requirements, e.g. read, write, execute, etc., are located within or on the same page to ensure that a page table attributes 129 can be properly set for each page 127 of the page table 125. For example, the firmware 101 may locate or relocate data requiring read and write permissions to a page with other data also requiring read and write permissions. Similarly, the firmware 101 may locate or relocate data requiring read-only permissions to a page with other data also requiring read-only permissions. Embodiments are not limited to these examples and other location/relocation operations may be performed.

At block 212, one or more page table attributes 129 may be set for the page table 125 and the pages 127. These page table attributes 129 may be configured and set prior to the SMI handler 115 being locked down in the SMRAM 107. Further, the page table attributes 129 may be SMM page table attributes applied to an SMM page table at the time of initialization of the device 100. Thus, the page table attributes 129 may be utilized to lock down various information and data in the pages 127 to make a malicious code attack more difficult or unachievable while operating in SMM.

As previously discussed, the page table attributes 129 may include settings and permissions to write, read, and/or execute information and data in the pages 127. In some embodiments, a combination of permissions may be set for one or more pages 127 in the page table 125. The page table attributes 129 may ensure the pages 127 are protected and to prevent malicious attacks, such as a code injection attack. In some embodiments, all mapped code pages may be designated as read-only and execute such that any attempt to overwrite a code page will cause a page fault. Embodiments are not limited in this manner. In some instances, only a portion of the mapped code pages may be designated as read-only and execute while other mapped code pages have different permission settings.

In another example, all mapped data pages may have page table attributes 129 that designate the pages as execution disable (eXecutionDisable) such that any attempt to execute a data page will cause a page fault. However and as similarly discussed above, in other instances only portion of the data pages may be designated as execution disable, while a different portion is configured in a different manner with different permissions.

In a third example, one or more of the mapped data pages may have page table attributes 129 that designate the pages as read and write (ReadWrite), while others may be designated as read-only (ReadOnly). More specifically, data pages that map the page table 125 itself, data pages that include critical data such as global descriptors and interrupt descriptors, and data pages that include additional data such as information in the SMST data and SMM data (protocol database data, S3 resume data, script data, etc.) may be designed as read-only. Any attempt to write to a page set as read-only will cause a page fault. Embodiments are not limited in this manner and, in some instances, any page 127 that does not need to be written to at the runtime may be set as read-only. In some instances, data in particular pages 127 may need to be accessed and written to during runtime. Thus, these pages 127 may be designated read and write in the page table attributes 129 and may include the program stack, dynamic global data, and the SMM state save area.

In embodiments, the logic flow 200 may include completing the initialization and boot sequence at block 214. In some instances, the SMI handler 115 may be locked down via setting a register such that the SMI handler 115 cannot modify itself. The boot sequence may also include other initialization steps and loading of the operating system such that a user may operate the device 100. Embodiments are not limited in this respect.

Figure 3:
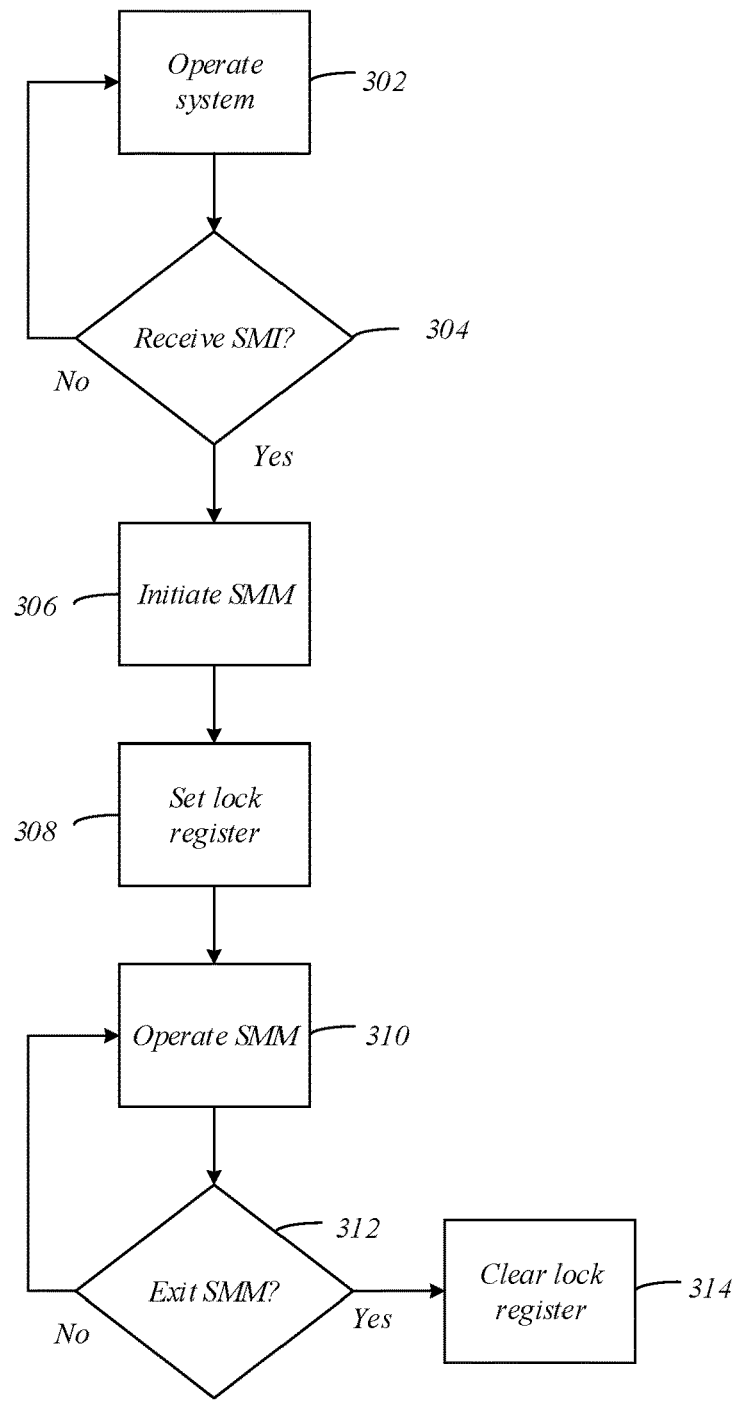
FIG. 3 illustrates an example of a second logic flow.

FIG. 3 illustrates example embodiment of a second logic flow 300. The logic flow 300 may be representative of some or all of the operations executed by one or more embodiments described herein. Further, the logic flow 300 may performed by circuitry, such as processing circuitry 124. Moreover, logic flow 300 may be performed in conjunction with one or more other logic flows discussed herein.

The logic flow 300 may be one example processing flow to operate the device 100 and CPU 120 in SMM while locking down various registers 122 and the page table attributes 129 to prevent malicious code attacks. At block 302, the logic flow 300 may include operating the device 100 in a "normal" mode of operation or not the SMM. The device 100 may continue to operate in this manner until it is turned off or an SMI is received at decision block 304. The SMI may be received via a signal on a pin of the CPU 120, or as an instruction via a bus coupled with the CPU 120. SMIs are typically the highest priority interrupts. In some instances, the SMI may be generated in response to a software instruction, usually a write to an I/O port such as 0xb2 (the SMI Command Port).

In some embodiment, one or more instructions may a write a value (the SMI Command Value) to an SMI Command Port. Typically processing circuitry detects the write to the SMI Command Port and asserts the SMI# pin on the CPU 120 or sends an SMI message to the CPU 120. Generally, the CPU 120 detects the SMI after the current instruction has been completed. The CPU 120 may save state for one or more of the registers 122 in a buffer and initializes or switches to SMM at block 308 and jumps to a pre-defined entry point.

At block 308, the CPU 120 may set the lock register 122-1 to prevent the SMM from modifying the page table attributes 129 and registers as described above in FIG. 2. As previously mentioned, one or more of the registers 122 may be locked via a WRMSR instruction setting the lock register 122-1. Moreover, the lock register 122-1 may be written to on each SMI close to the pre-defined entry point. As previously discussed, the locked registers may include the page table registers 122-2 and the SMM registers 122-3. Note that a lock may occur for each SMI by writing to a MSR associated with each SMI and they may be individually controllable or aggregated together.

The logic flow 300 may include operating in the SMM at block 310 and determine whether to exit the SMM at decision block 312. The CPU 120 may exit the SMM when a resume from system management mode (RSM) instruction is received by the CPU 120. The RSM instruction returns program control from SMM to the application program or operating-system procedure that was interrupted when the CPU 120 received an SMI. The CPU's 120 state is restored from a dump created upon entering SMM. If the CPU 120 detects invalid state information during state restoration, it enters the shutdown state. Further and at block 314, the lock register 122-1 may be cleared upon reception of the RSM instruction and exiting the SMM.

Figure 4:
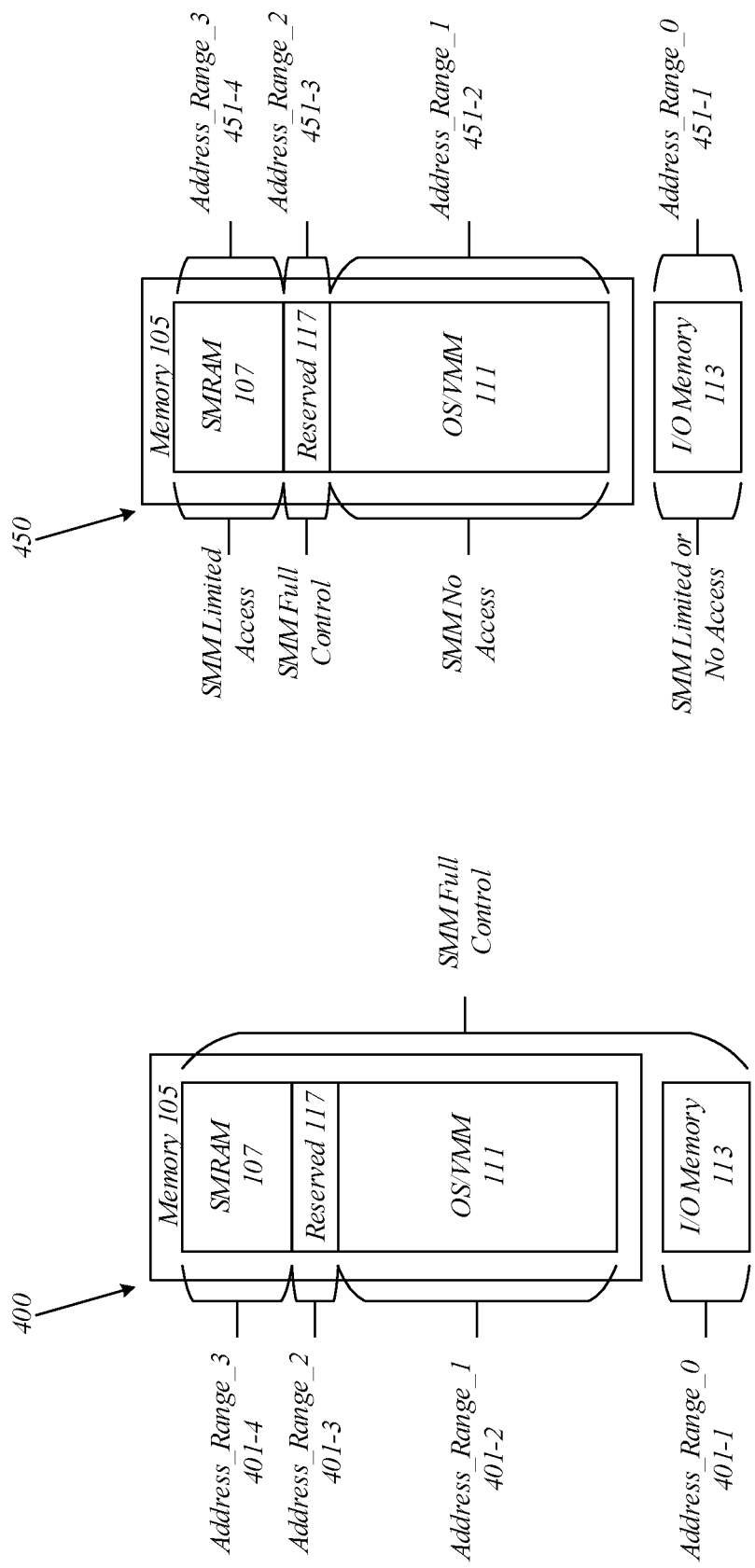
FIG. 4 illustrates examples of address mapping without and with access controls.

FIG. 4 illustrates an example of address mapping without access controls enabled 400 and an example of address mapping with access controls enabled 450. The access controls may be determined or based on one or more configurations and settings applied to a page table 125 and pages 127, for example. These configurations and settings may be the page table attributes 129 that define various access rules and permissions for the various addresses ranges of the device 100.

Address mapping 400 illustrates I/O memory 113 mapped to address_range_0 401-1, OS/VMM 111 mapped to address_range_1 401-2, reserved 117 mapped to address_range_2 401-3, and SMRAM 107 mapped to address_range_3 401-4. When access controls are not enabled and page table attributes 129 are not set for the page table 125, the SMM may have full control of the various address ranges 401-1 through 404-4 with respect to reading, writing, and executing code and data in the different regions of memory 105 and I/O memory 113. Thus, the device 100 may be vulnerable to attacks.

Address mapping 450 illustrates I/O memory 113 mapped to address_range_0 451-1, OS/VMM 111 mapped to address_range_1 451-2, reserved 117 mapped to address_range_2 451-3, and SMRAM 107 mapped to address_range_3 451-4. In this example, access controls and page table attributes 129 may be enabled and set such that various address ranges may have limited accessibility.

For example, instructions and operations of the SMM may have limited or no access to the I/O memory 113 (memory mapped I/O) associated with address_range_0 451-0. Further, the OS/VMM 111 region may not be accessibly by the CPU 120 in SMM. Alternatively, the reserved region 117 associated with address_range_2 451-3 may be fully accessible to the SMM and used by the SMM to store information, data, variables, and so forth while the CPU 120 is processing in SMM. The SMRAM 107 associated with address_range_3 451-3 may be limitedly accessible to the SMM. The accessibility of each address_range illustrated in FIG. 4 may be determined and based on whether one or more page table attributes 129 exist and on the particular page table attributes 129 settings themselves. Further, embodiments are not limited to the illustrated example of FIG. 4 and different address ranges may be accessible, limitedly accessible, and/or not accessible to the SMM based on different configurations and settings.

Figure 5:
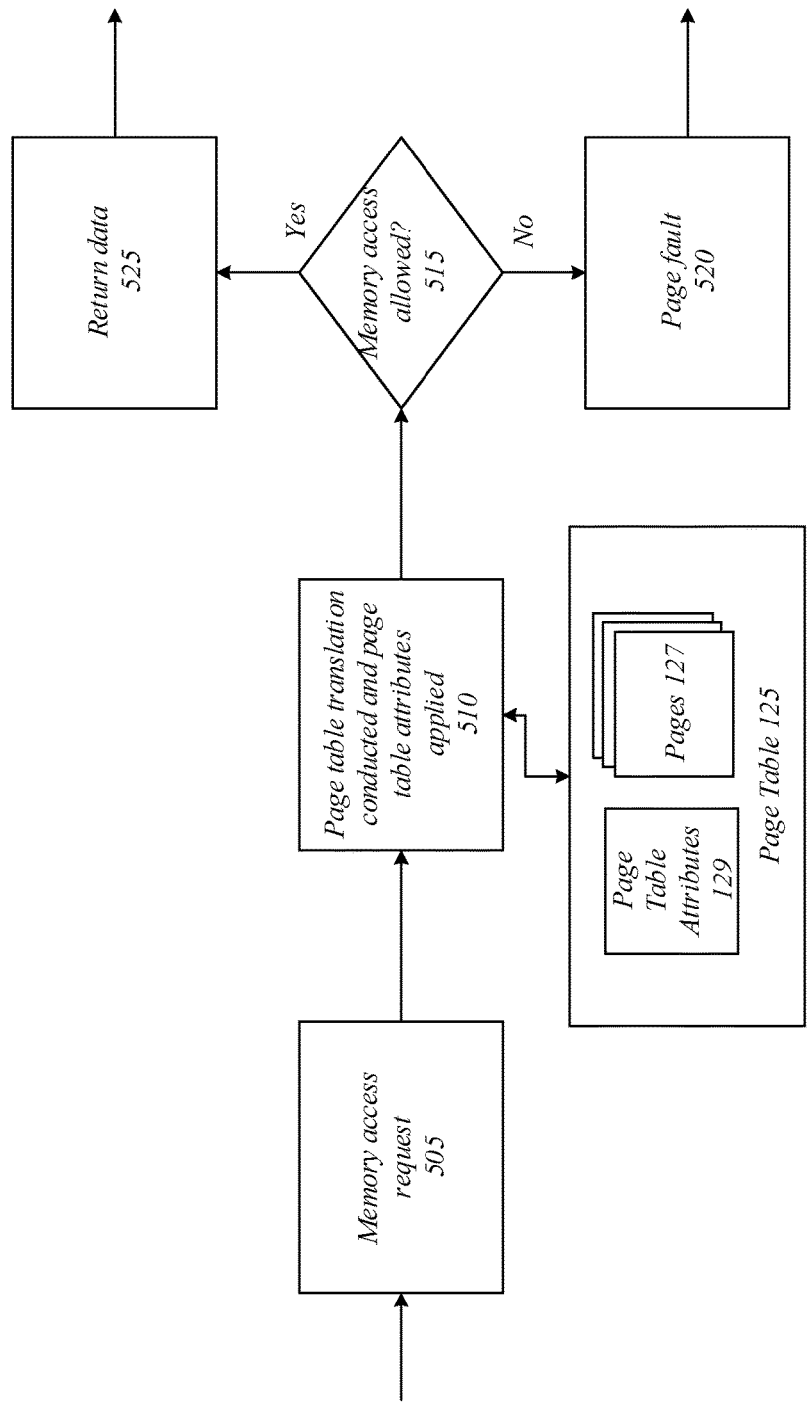
FIG. 5 illustrates an example of a first processing flow.

FIG. 5 illustrates an example of a first processing flow 500 to process a memory access request, such as a read, write, or execute, while page table attributes 129 are configured for a device 100. The processing flow 500 may be representative of some or all of the operations executed by one or more embodiments described herein. For example, the processing flow 500 may illustrate operations performed by device 100, and in particular, processing circuitry 124 while the CPU 120 is operating in the SMM.

In the illustrated embodiment shown in FIG. 5, the processing flow 500 may include receiving a memory access request 505 from an instruction while the device 100 and CPU 120 are operating in SMM. The memory access request may include one or more virtual addresses to access information, data, code, etc. stored in the memory 105 at one or more physical addresses. In embodiments, the processing flow 500 may include performing a page table translation based on the virtual address(es) to determine physical address(es) via a look-up in the page table 125 and pages 127 at block 510. Further, the processing flow 500 may also include applying one or more page table attributes 129 to the lookup request. These page table attributes 129 may have been determined during an initialization phase of the device, as previously discussed.

Further and at block 515, the processing flow 500 may include making a determination as to whether the requesting instruction has the appropriate permissions to access the data, code, information, etc. at the requested virtual address(es) based on the page table attributes 129. If the requesting instruction does not have permission to access what is stored at the requested virtual address(es), the processing flow 500 may return a page fault at block 520. However, if the requesting instruction does have the appropriate permissions to access the data, code, information, etc, the logic flow 500 may return the data that is stored in the memory 105 at the translated physical address(es). Embodiments are not limited to this example.

Figure 6:
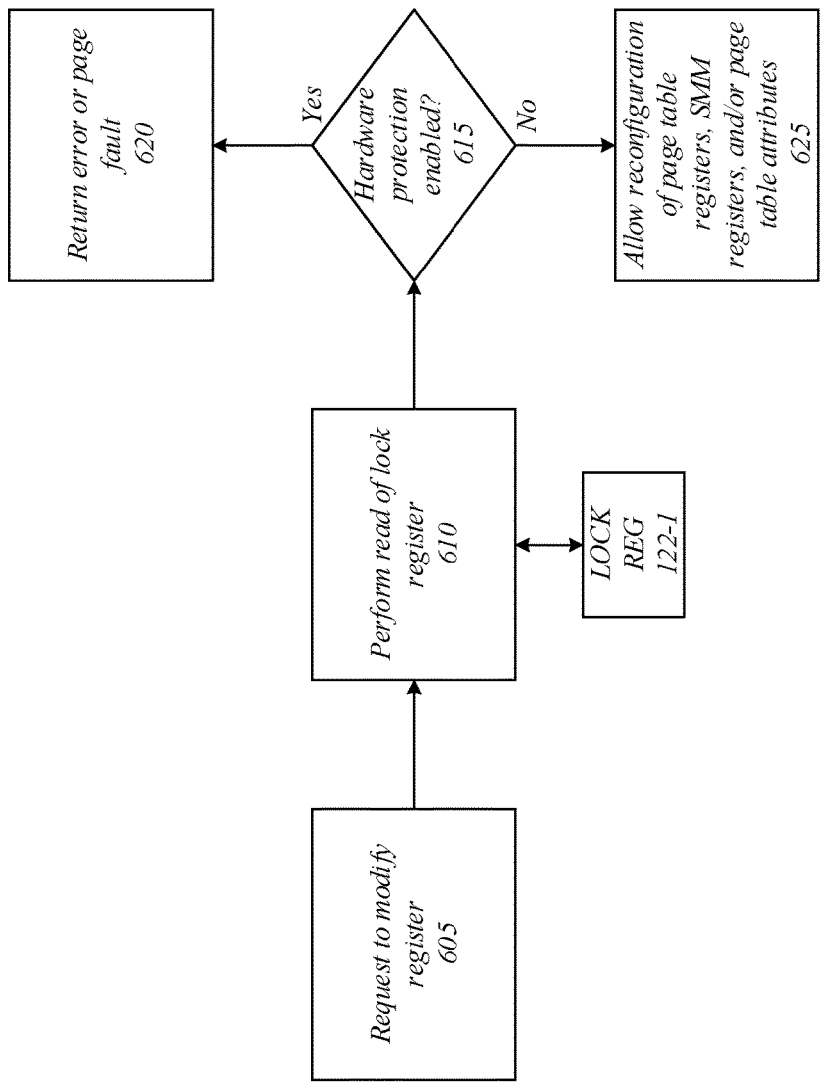
FIG. 6 illustrates an example of a second processing flow.

FIG. 6 illustrates an example of a second processing flow 600 to process a request to modify a register. The processing flow 600 may be representative of some or all of the operations executed by one or more embodiments described herein. For example, the processing flow 600 may illustrate operations performed by device 100, and in particular, CPU 120 and processing circuitry 124.

As previously mentioned, a newly created lock register 122-1 in the CPU 120 may be used to lock one or more registers 122 including page table registers 122-2 and SMM registers 122-3 and page table attributes 129. The lock register 122-1 may be set upon an entry point to the SMM at the close of a SMI handling. When the lock register 122-1 is set access and/or modification of the contents of the page table registers 122-2 and SMM registers 122-3 may be prohibited.

Processing flow 600 illustrates one example of processing a request to modify a register 122, which may either be a page table register 122-2 or a SMM register 122-3. At block 605, the processing flow 600 may include receiving a request to modify a register 605. The request may be received by the CPU 120 and based on one or more instructions that may have been generated or based on software or firmware code, for example. In some instances, the request may be based on one or more command line instructions and embodiments are not limited in this manner. In some instances, the request to modify may be a write command to write to a register 122. Embodiments are not so limited.

At block 610, the CPU 120 may read the lock register 122-1 to determine whether the lock register 122-1 is set or not set. The lock register 122-1 include a single bit indicating whether it is set or not set, for example. In some embodiments, the lock register 122-1 may have more than one bit set and used to determine whether hardware protection is enabled. In a third example, the entire lock register 122-1 may be set and used to set hardware protections. Embodiments are not limited in this manner.

At decision block 615, the CPU 120 may determine whether hardware protection enabled or not enabled based on whether the lock register 122-1 is set or not set. For example, if the lock register 122-1 is set, hardware protection may be enabled at decision block 615 and the CPU 120 prohibit modification of the register and return an error or page fault at block 620. However, if the lock register 122-1 is not set, hardware protection may not be enabled at decision block 615 and the CPU 120 may permit modification of the register 122 indicated in the request to modify (or write). Thus, reconfiguration of page table registers 122-2, SMM registers 122-3, and/or page table attributes 129 may be permitted at block 625. Embodiments are not limited in this manner.

FIG. 7 illustrates an example embodiment of a third logic flow 700. The logic flow 700 may be representative of some or all of the operations executed by one or more embodiments described herein. For example, the logic flow 700 may illustrate operations performed by device 100 and CPU 120. In the illustrated embodiment shown in FIG. 7, the logic flow 700 may include allocating a portion of the memory as system management random access memory (SMRAM) including a system management interrupt (SMI) handler for a system management mode (SMM), the SMI handler to handle SMIs for the SMM at block 705.

Further and at block 710, the logic flow 700 may include generating a page table for the SMM, the page table comprising one or more mapped pages to map virtual addresses to physical addresses for the SMM, and setting one or more page table attributes for the page table to prevent a malicious code attack on the SMM at block 715. As previously mentioned, the page table attributes may include one or more permissions and settings that may enable or disable one or more instructions from reading, writing, and executing data and code that may be mapped by the page table. Thus, using the page table attributes in conjunction with setting a lock register may provide a more secure compute environment while a device is operating in SMM. For example, the one or more page table attributes and registers associated with the page table and the SMM may not be modified or written too when the lock register is set. This may prevent a malicious attack that may use the registers as a back door to gain access to low levels of operation. Embodiments are not limited to this example.

Figure 8:
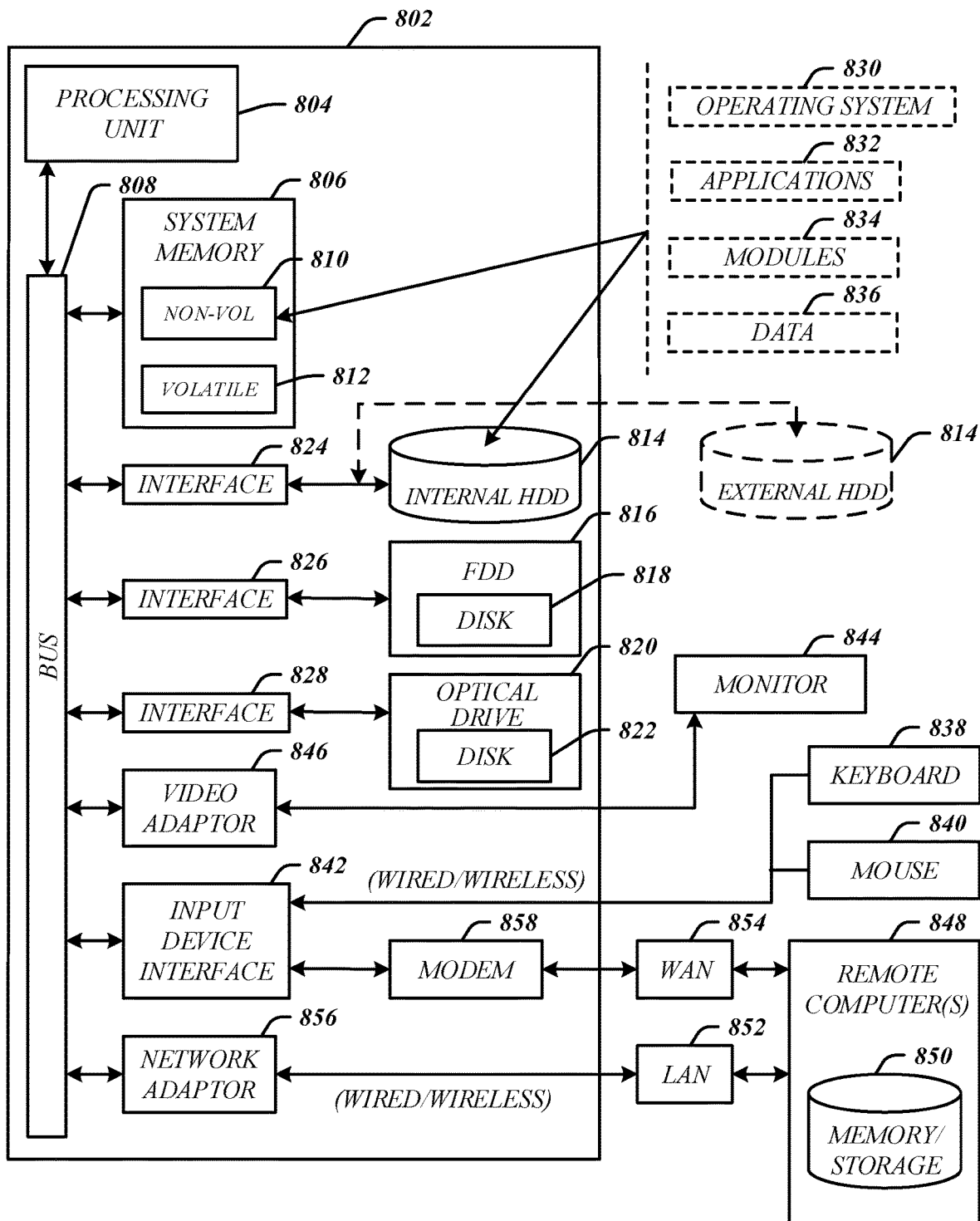
FIG. 8 illustrates an example embodiment of a device.

FIG. 8 illustrates an embodiment of an exemplary computing architecture 800 suitable for implementing various embodiments as previously described. In one embodiment, the computing architecture 800 may include or be implemented as part of device 100 or 900.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 includes a processing unit 804, a system memory 806 and a system bus 808. The processing unit 804 can be any of various commercially available processors.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the system 700.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the device 100 and 800 as previously described with reference to FIGS. 1-8 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 9:
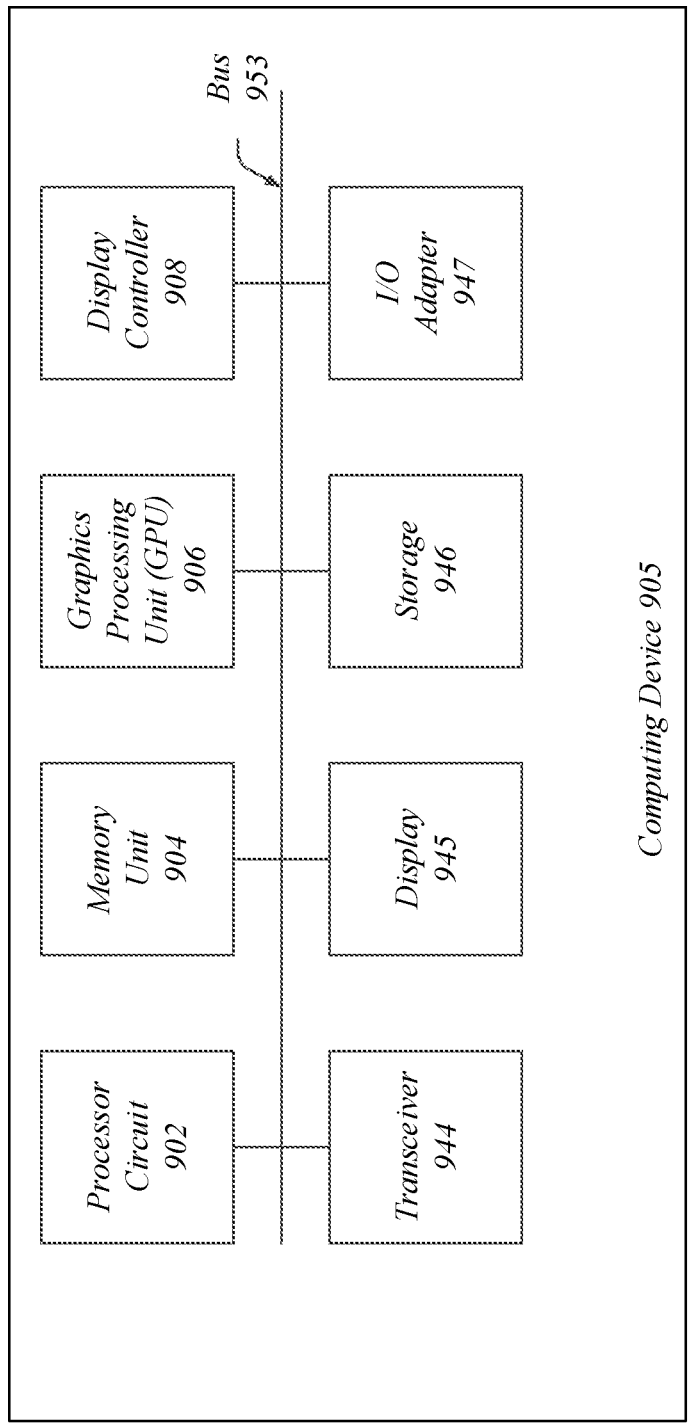
FIG. 9 illustrates an exemplary embodiment of a first computing architecture.

FIG. 9 illustrates one embodiment of a system 900. In various embodiments, system 900 may be representative of a system or architecture suitable for use with one or more embodiments described herein, such as device 100.

As shown in FIG. 9, system 900 may include multiple elements. One or more elements may be implemented using one or more circuits, components, registers, processors, software subroutines, modules, or any combination thereof, as desired for a given set of design or performance constraints. Although FIG. 9 shows a limited number of elements in a certain topology by way of example, it can be appreciated that more or less elements in any suitable topology may be used in system 900 as desired for a given implementation. The embodiments are not limited in this context.

In various embodiments, system 900 may include a computing device 905 which may be any type of computer or processing device including a personal computer, desktop computer, tablet computer, netbook computer, notebook computer, laptop computer, server, server farm, blade server, or any other type of server, and so forth.

Examples of a computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

In various embodiments, computing device 905 may include processor circuit 902. Processor circuit 902 may be implemented using any processor or logic device. The processing circuit 902 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processing circuit 902 may be connected to and communicate with the other elements of the computing system via an interconnect 743, such as one or more buses, control lines, and data lines.

In one embodiment, computing device 905 may include a memory unit 904 to couple to processor circuit 902. Memory unit 904 may be coupled to processor circuit 902 via communications bus 953, or by a dedicated communications bus between processor circuit 902 and memory unit 904, as desired for a given implementation. Memory unit 04 may be implemented using any machine-readable or computer-readable media capable of storing data, including both volatile and non-volatile memory. In some embodiments, the machine-readable or computer-readable medium may include a non-transitory medium. The embodiments are not limited in this context.

Computing device 905 may include a graphics processing unit (GPU) 906, in various embodiments. The GPU 906 may include any processing unit, logic or circuitry optimized to perform graphics-related operations as well as the video decoder engines and the frame correlation engines. The GPU 906 may be used to render 2-dimensional (2-D) and/or 3-dimensional (3-D) images for various applications such as video games, graphics, computer-aided design (CAD), simulation and visualization tools, imaging, etc. Various embodiments are not limited in this manner; GPU 906 may process any type of graphics data such as pictures, videos, programs, animation, 3D, 2D, objects images and so forth.

In some embodiments, computing device 905 may include a display controller 908. Display controller 908 may be any type of processor, controller, circuit, logic, and so forth for processing graphics information and displaying the graphics information. The display controller 908 may receive or retrieve graphics information from one or more buffers. After processing the information, the display controller 908 may send the graphics information to a display.

In various embodiments, system 900 may include a transceiver 944. Transceiver 944 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 944 may operate in accordance with one or more applicable standards in any version. The embodiments are not limited in this context.

In various embodiments, computing device 905 may include a display 945. Display 945 may constitute any display device capable of displaying information received from processor circuit 902, graphics processing unit 906 and display controller 908.

In various embodiments, computing device 905 may include storage 946. Storage 946 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 946 may include technology to increase the storage performance enhanced protection for valuable digital media when multiple hard drives are included, for example. Further examples of storage 946 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, computing device 905 may include one or more I/O adapters 947. Examples of I/O adapters 947 may include Universal Serial Bus (USB) ports/adapters, IEEE 1394 Firewire ports/adapters, and so forth. The embodiments are not limited in this context.

The detailed disclosure now turns to providing examples that pertain to further embodiments. Examples one through forty-one (1-41) provided below are intended to be exemplary and non-limiting In a first example, a system, device, apparatus may include memory and logic, at least a portion of which is implemented in processing circuitry coupled to the memory. In some embodiments, the logic may allocate a portion of the memory as system management random access memory (SMRAM) including a system management interrupt (SMI) handler for a system management mode (SMM), the SMI handler to handle SMIs for the SMM, generate a page table for the SMM, the page table comprising one or more mapped pages to map virtual addresses to physical addresses for the SMM, and set one or more page table attributes for the page table to prevent a malicious code attack on the SMM.

In a second example and in furtherance of the first example, a system, device, apparatus may include the one or more page table attributes comprising permissions set as read-only and execute for one or more mapped code pages of the page table.

In a third example and in furtherance of any previous example, a system, device, apparatus may include the one or more page table attributes comprising permissions set as execution disable for one or more mapped data pages of the page table.

In a fourth example and in furtherance of any previous example, a system, device, apparatus may include the one or more page table attributes comprising permissions set as read and write for at least one of the one or more mapped data pages and permissions set as read-only for at least another one of the one or more mapped data pages.

In a fifth example and in furtherance of any previous example, a system, device, apparatus may include the one or more page table attributes comprising permissions set as read-only for the one or more mapped data pages that map the page table itself.

In a sixth example and in furtherance of any previous example, a system, device, apparatus may include the one or more page table attributes comprising permissions set as read-only for the one or more mapped data pages that map critical data comprising at least one of global descriptors and interrupt descriptors.

In a seventh example and in furtherance of any previous example, a system, device, apparatus may include the one or more page table attributes comprising permissions set as read-only for the one or more mapped data pages that map additional data comprising at least one of system management system table data and system management mode data.

In an eighth example and in furtherance of any previous example, a system, device, apparatus may include a processor comprising the processing circuitry and a plurality of registers, the plurality of registers comprising a register to lock one or more other registers of the plurality of registers associated with the page table or SMM and the one or more page table attributes.

In a ninth example and in furtherance of any previous example, a system, device, apparatus may include the logic to set at least one bit for the register based on an entry point to enter the SMM.

In a tenth example and in furtherance of any previous example, a system, device, apparatus may include the logic to clear the register in response to an instruction to exit the SMM.

In an eleventh example and in furtherance of any previous example, a non-transitory computer-readable storage medium comprising a plurality of instructions that when executed enable processing circuitry to allocate a portion of memory as system management random access memory (SMRAM) including a system management interrupt (SMI) handler for a system management mode (SMM), the SMI handler to handle SMIs for the SMM, generate a page table for the SMM, the page table comprising one or more mapped pages to map virtual addresses to physical addresses for the SMM, and set one or more page table attributes for the page table to prevent a malicious code attack on the SMM.

In a twelfth example and in furtherance of any previous example, a non-transitory computer-readable storage medium comprising a plurality of instructions that when executed enable processing circuitry to set the one or more page table attributes comprising permissions as read-only and execute for one or more mapped code pages of the page table.

In a thirteenth example and in furtherance of any previous example, a non-transitory computer-readable storage medium comprising a plurality of instructions that when executed enable processing circuitry to set the one or more page table attributes comprising permissions as execution disable for one or more mapped data pages of the page table.

In a fourteenth example and in furtherance of any previous example, a non-transitory computer-readable storage medium comprising a plurality of instructions that when executed enable processing circuitry to set the one or more page table attributes comprising permissions as read and write for at least one of the one or more mapped data pages and permissions as read-only for at least another one of the one or more mapped data pages.

In a fifteenth example and in furtherance of any previous example, a non-transitory computer-readable storage medium comprising a plurality of instructions that when executed enable processing circuitry to set the one or more page table attributes comprising permissions as read-only for the one or more mapped data pages that map the page table itself.

In a sixteenth example and in furtherance of any previous example, a non-transitory computer-readable storage medium comprising a plurality of instructions that when executed enable processing circuitry to set the one or more page table attributes comprising permissions as read-only for the one or more mapped data pages that map critical data comprising at least one of global descriptors and interrupt descriptors.

In a seventeenth example and in furtherance of any previous example, a non-transitory computer-readable storage medium comprising a plurality of instructions that when executed enable processing circuitry to set the one or more page table attributes comprising permissions as read-only for the one or more mapped data pages that map additional data comprising at least one of system management system table data and system management mode data.

In an eighteenth example and in furtherance of any previous example, a non-transitory computer-readable storage medium comprising a plurality of instructions that when executed enable processing circuitry to set at least one bit on a register of a plurality of registers, the at least one bit to enable hardware protection for the remaining plurality of registers and the one or more page table attributes.

In a nineteenth example and in furtherance of any previous example, a non-transitory computer-readable storage medium comprising a plurality of instructions that when executed enable processing circuitry to set the at least one bit based on an entry point to enter the SMM.

In a twentieth example and in furtherance of any previous example, a non-transitory computer-readable storage medium comprising a plurality of instructions that when executed enable processing circuitry to clear the at least one bit in response to an instruction to exit the SMM.

In a twenty-first example and in furtherance of any previous example, a computer-implemented method may include allocating a portion of memory as system management random access memory (SMRAM) including a system management interrupt (SMI) handler for a system management mode (SMM), the SMI handler to handle SMIs for the SMM, generating a page table for the SMM, the page table comprising one or more mapped pages to map virtual addresses to physical addresses for the SMM, and setting one or more page table attributes for the page table to prevent a malicious code attack on the SMM.

In a twenty-second example and in furtherance of any previous example, a computer-implemented method may include setting the one or more page table attributes comprising permissions for one or more mapped code pages of the page table and one or more mapped data pages of the page table.

In a twenty-third example and in furtherance of any previous example, a computer-implemented method may include setting at least one bit on a register of a plurality of registers, the at least one bit to enable hardware protection for the remaining plurality of registers and the one or more page table attributes.

In a twenty-fourth example and in furtherance of any previous example, a computer-implemented method may include comprising setting the at least one bit on the register based on an entry point to enter the SMM.

In a twenty-fifth example and in furtherance of any previous example, a computer-implemented method may include comprising clearing the at least one bit on the register in response to an instruction to exit the SMM.

In a twenty-sixth example and in furtherance of any previous example, a computer-implemented method may include setting the one or more page table attributes comprising permissions as read-only and execute for one or more mapped code pages of the page table.

In a twenty-seventh example and in furtherance of any previous example, a computer-implemented method may include setting the one or more page table attributes comprising permissions as execution disable for one or more mapped data pages of the page table.

In a twenty-eighth example and in furtherance of any previous example, a computer-implemented method may include setting the one or more page table attributes comprising permissions as read and write for at least one of the one or more mapped data pages and permissions as read-only for at least another one of the one or more mapped data pages.

In a twenty-ninth example and in furtherance of any previous example, a computer-implemented method may include setting the one or more page table attributes comprising permissions as read-only for the one or more mapped data pages that map the page table itself.

In a thirtieth example and in furtherance of any previous example, a computer-implemented method may include setting the one or more page table attributes comprising permissions as read-only for the one or more mapped data pages that map critical data comprising at least one of global descriptors and interrupt descriptors.

In a thirty-first example and in furtherance of any previous example, a computer-implemented method may include setting the one or more page table attributes comprising permissions as read-only for the one or more mapped data pages that map additional data comprising at least one of system management system table data and system management mode data.

In a thirty-second example and in furtherance of any previous example, a system, device, apparatus, etc. may include means for allocating a portion of memory as system management random access memory (SMRAM) including a system management interrupt (SMI) handler for a system management mode (SMM), the SMI handler to handle SMIs for the SMM, means for generating a page table for the SMM, the page table comprising one or more mapped pages to map virtual addresses to physical addresses for the SMM, and means for setting one or more page table attributes for the page table to prevent a malicious code attack on the SMM.

In a thirty-third example and in furtherance of any previous example, a system, device, apparatus, etc. may include means for setting the one or more page table attributes comprising permissions as read-only and execute for one or more mapped code pages of the page table.

In a thirty-fourth example and in furtherance of any previous example, a system, device, apparatus, etc. may include means for setting the one or more page table attributes comprising permissions as execution disable for one or more mapped data pages of the page table.

In a thirty-fifth example and in furtherance of any previous example, a system, device, apparatus, etc. may include means for setting the one or more page table attributes comprising permissions as read and write for at least one of the one or more mapped data pages and permissions as read-only for at least another one of the one or more mapped data pages.

In a thirty-sixth example and in furtherance of any previous example, a system, device, apparatus, etc. may include means for setting the one or more page table attributes comprising permissions as read-only for the one or more mapped data pages that map the page table itself.

In a thirty-seventh example and in furtherance of any previous example, a system, device, apparatus, etc. may include means for setting the one or more page table attributes comprising permissions as read-only for the one or more mapped data pages that map critical data comprising at least one of global descriptors and interrupt descriptors.

In a thirty-eighth example and in furtherance of any previous example, a system, device, apparatus, etc. may include means for setting the one or more page table attributes comprising permissions as read-only for the one or more mapped data pages that map additional data comprising at least one of system management system table data and system management mode data.

In a thirty-ninth example and in furtherance of any previous example, a system, device, apparatus, etc. may include means for setting at least one bit on a register of a plurality of registers, the at least one bit to enable hardware protection for the remaining plurality of registers and the one or more page table attributes.

In a fortieth example and in furtherance of any previous example, a system, device, apparatus, etc. may include means for setting the at least one bit based on an entry point to enter the SMM.

In a forty-first example and in furtherance of any previous example, a system, device, apparatus, etc. may include means for clearing the at least one bit in response to an instruction to exit the SMM.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
    memory comprising instructions; and
    processing circuitry coupled to the memory, the processing circuitry comprising one or more registers and arranged to execute the instructions during initialization to:
        allocate a portion of the memory as system management random access memory (SMRAM),
        install including a system management interrupt (SMI) handler for a system management mode (SMM) into the SMRAM, the SMI handler to handle SMIs for the SMM post-initialization,
        lock the SMI handler via at least one of the one or more registers,
        generate a page table for the SMM, the page table comprising a plurality of mapped pages to map virtual addresses to physical addresses for the SMM, the plurality of pages comprising mapped code pages and mapped data pages,
        designate, via at least one of the one or more registers, the mapped code pages of the plurality of pages as read only and execute such that any attempt to overwrite the mapped code pages will cause a page fault, and
        designate, via at least one of the one or more registers, the mapped data pages of the plurality of pages as execution disabled such that any attempt to execute the mapped data pages will cause a page fault.

2. The apparatus of claim 1, the one or more registers comprising permissions set as read and write for at least one of the one or more mapped data pages and permissions set as read-only for at least another one of the one or more mapped data pages.

3. The apparatus of claim 1, the one or more registers comprising permissions set as read-only for the one or more mapped data pages that map the page table itself.

4. The apparatus of claim 1, the one or more registers comprising permissions set as read-only for the one or more mapped data pages that map critical data comprising at least one of global descriptors and interrupt descriptors.

5. The apparatus of claim 1, the one or more registers comprising permissions set as read-only for the one or more mapped data pages that map additional data comprising at least one of system management system table data and system management mode data.

6. The apparatus of claim 1,
    the one or more registers comprising a plurality of registers and comprising a register to lock one or more other registers of the plurality of registers associated with the page table or SMM.

7. The apparatus of claim 6, processing circuitry further arranged to execute the instructions during initialization to set at least one bit for the register based on an entry point to enter the SMM.

8. The apparatus of claim 6, processing circuitry further arranged to execute the instructions during initialization to set at least one bit for the register based on one or more operations operating while in the SMM after an entry point.

9. A non-transitory computer-readable storage medium comprising a plurality of instructions that when executed by processing circuitry comprising one or more registers during initialization of the processing circuitry, enable the processing circuitry to:
    allocate a portion of memory as system management random access memory (SMRAM),
    install a system management interrupt (SMI) handler for a system management mode (SMM) into the SMRAM, the SMI handler to handle SMIs for the SMM post-initialization,
    lock the SMI handler via at least one of the plurality of registers,
    generate a page table for the SMM, the page table comprising a plurality of mapped pages to map virtual addresses to physical addresses for the SMM, the plurality of pages comprising mapped code pages and mapped data pages,
    designate, via at least one of the one or more registers, the mapped code pages of the plurality of pages as read only and execute such that any attempt to overwrite the mapped code pages will cause a page fault, and
    designate, via at least one of the one or more registers, the mapped data pages of the plurality of pages as execution disabled such that any attempt to execute the mapped data pages will cause a page fault.

10. The non-transitory computer-readable storage medium of claim 9, the plurality of instructions comprising instructions that when executed enable the processing circuitry to set the one or more registers comprising permissions as read and write for at least one of the one or more mapped data pages and permissions as read-only for at least another one of the one or more mapped data pages.

11. The non-transitory computer-readable storage medium of claim 9, the plurality of instructions comprising instructions that when executed enable the processing circuitry to set the one or more registers comprising permissions as read-only for the one or more mapped data pages that map the page table itself.

12. The non-transitory computer-readable storage medium of claim 9, the plurality of instructions comprising instructions that when executed enable the processing circuitry to set the one or more registers comprising permissions as read-only for the one or more mapped data pages that map critical data comprising at least one of global descriptors and interrupt descriptors.

13. The non-transitory computer-readable storage medium of claim 9, the plurality of instructions comprising instructions that when executed enable the processing circuitry to set the one or more registers comprising permissions as read-only for the one or more mapped data pages that map additional data comprising at least one of system management system table data and system management mode data.

14. The non-transitory computer-readable storage medium of claim 9, the one or more registers comprising a plurality of registers, the plurality of instructions comprising instructions that when executed enable the processing circuitry to set at least one bit on a register of the plurality of registers, the at least one bit to enable hardware protection for the remaining plurality of registers.

15. The non-transitory computer-readable storage medium of claim 14, the plurality of instructions comprising instructions that when executed enable the processing circuitry set at least one bit for the register based on an entry point to enter the SMM.

16. The non-transitory computer-readable storage medium of claim 14, the plurality of instructions comprising instructions that when executed enable the processing circuitry to set at least one bit for the register based on one or more operations operating while in the SMM after an entry point.

17. A computer-implemented method, comprising:
allocating a portion of memory as system management random access memory (SMRAM),
installing a system management interrupt (SMI) handler for a system management mode (SMM) into SMRAM, the SMI handler to handle SMIs for the SMM post-initialization,
locking the SMI handler via at least one of the one or more registers,
generating a page table for the SMM, the page table comprising a plurality of mapped pages to map virtual addresses to physical addresses for the SMM, the plurality of pages comprising mapped code pages and mapped data pages,
designating, during initialization of processing circuitry comprising one or more registers, via at least one of the one or more registers, the mapped code pages of the plurality of pages as read only and execute such that any attempt to overwrite the mapped code pages will cause a page fault, and
designating, via at least one of the one or more registers, the mapped data pages of the plurality of pages as execution disabled such that any attempt to execute the mapped data pages will cause a page fault.

18. The computer-implemented method of claim 17, the one or more registers comprising a plurality of registers, the method comprising setting at least one bit on a register of the plurality of registers, the at least one bit to enable hardware protection for the remaining plurality of registers and the one or more page table attributes.

19. The computer-implemented method of claim 18, comprising setting the at least one bit on the register based on an entry point to enter the SMM or one or more operations operating in the SMM.

20. The computer-implemented method of claim 18, comprising setting at least one bit for the register based on one or more operations operating while in the SMM after an entry point.

\* \* \* \* \*

UNITED STATES PATENT AND TRADEMARK OFFICE
CERTIFICATE OF CORRECTION

PATENT NO. : 10,776,283 B2
APPLICATION NO. : 15/089235
DATED : September 15, 2020
INVENTOR(S) : Kirk D. Brannock, Barry E. Huntley and Vincent J. Zimmer Page 1 of 1

It is certified that error appears in the above-identified patent and that said Letters Patent is hereby corrected as shown below:

In the Claims

Column 23, Line 10, replace "install including a system" with -- install a system --.

Signed and Sealed this
Fifth Day of January, 2021

Andrei Iancu
*Director of the United States Patent and Trademark Office*